(12) United States Patent
    Johnson

(10) Patent No.: US 12,606,125 B2
(45) Date of Patent: Apr. 21, 2026

(54) VEHICLE CONTROL DEVICE

(71) Applicant: Ella Johnson, Lima, OH (US)

(72) Inventor: Ella Johnson, Lima, OH (US)

( * ) Notice: Subject to any disclaimer, the term of this patent is extended or adjusted under 35 U.S.C. 154(b) by 147 days.

(21) Appl. No.: 18/386,166

(22) Filed: Nov. 1, 2023

(65) Prior Publication Data

US 2024/0140359 A1 May 2, 2024

Related U.S. Application Data

(60) Provisional application No. 63/421,898, filed on Nov. 2, 2022.

(51) Int. Cl.
    B60R 25/24      (2013.01)
    B60H 1/00       (2006.01)
    B60R 25/01      (2013.01)
    E05F 15/77      (2015.01)

(52) U.S. Cl.
    CPC ......... B60R 25/24 (2013.01); B60H 1/00657 (2013.01); B60R 25/01 (2013.01); E05F 15/77 (2015.01); B60R 2325/205 (2013.01); E05Y 2400/66 (2013.01); E05Y 2900/548 (2013.01)

(58) Field of Classification Search
    CPC ... B60R 25/24; B60R 25/01; B60R 2325/205; B60H 1/00657; E05F 15/77; E05Y 2400/66; E05Y 2900/548

USPC ............................................. 701/2
See application file for complete search history.

(56)              References Cited

U.S. PATENT DOCUMENTS

| | | | | |
|---|---|---|---|---|
| 11,017,620 B1 * | 5/2021 | Kim | ...................... | G06V 20/56 |
| 2014/0277837 A1 * | 9/2014 | Hatton | ................ | H04L 63/0853 |
| | | | | 701/2 |
| 2018/0154864 A1 * | 6/2018 | Kunze | ................ | G07C 9/00182 |
| 2018/0297558 A1 * | 10/2018 | Froitzheim | ............. | E05B 83/36 |
| 2019/0080532 A1 * | 3/2019 | Lee | ....................... | B60R 25/241 |

FOREIGN PATENT DOCUMENTS

| | | | |
|---|---|---|---|
| CN | 104158944 | * | 11/2014 |
| WO | WO-2015/170821 | * | 11/2015 |
| WO | WO-2016/145107 | * | 9/2016 |

\* cited by examiner

*Primary Examiner* — Muhammad Shafi
(74) *Attorney, Agent, or Firm* — The Iwashko Law Firm, PLLC; Lev Ivan Gabriel Iwashko

(57)              ABSTRACT

A vehicle control device, including a main body, a vehicle control unit disposed within the main body to allow a user to control a vehicle, a vehicle power button disposed on at least a portion of the main body to allow the user to power on the vehicle from a distance, a trunk button disposed on at least a portion of the main body to allow the user to open a trunk of the vehicle from a distance, and a plurality of climate control buttons to allow the user to control an air conditioner or a heater of the vehicle from a distance.

3 Claims, 1 Drawing Sheet

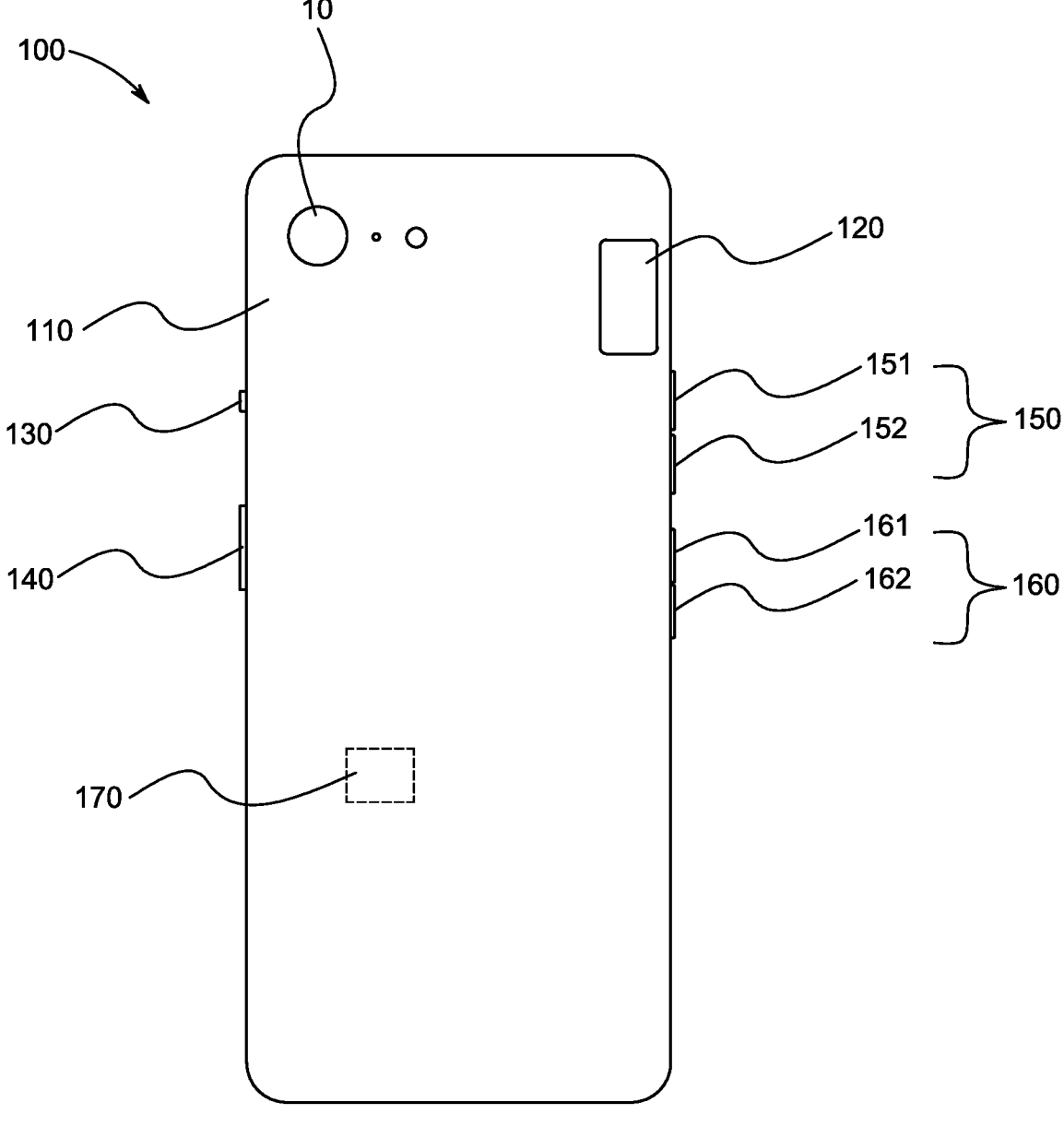

VEHICLE CONTROL DEVICE

CROSS-REFERENCE TO RELATED APPLICATIONS

This application claims priority under 35 USC § 120 from U.S. Provisional Application No. 63/421,898, entitled "Vehicle Control Device," which was filed on Nov. 2, 2022, in the United States Patent and Trademark Office, the disclosure of which is incorporated herein in its entirety by reference.

BACKGROUND

1. Field

The present general inventive concept relates generally to a remote controller, and particularly, to a vehicle control device.

2. Description of the Related Art

Most vehicles, such as automobiles, trucks, sport utility vehicles (SUV), and/or vans have a traditional lock that requires a key and/or a key fob. The key and/or the key fob have simple buttons that are remotely connected to the vehicle and usually lock and/or unlock at least one vehicle door. Moreover, the key and/or the key fob can open a trunk of the vehicle.

However, many users can easily misplace the key and/or the key fob. Also, for some users, it is important to warm-up the vehicle before operating it, particularly in colder climates. Additionally, most functions of the vehicle require being physically present in the vehicle to start.

Therefore, there is a need for a vehicle control device that can not only remotely lock and/or unlock the vehicle, but also remotely start the vehicle.

SUMMARY

The present general inventive concept provides a vehicle control device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle control device, including a main body, a vehicle control unit disposed within the main body to allow a user to control a vehicle, a vehicle power button disposed on at least a portion of the main body to allow the user to power on the vehicle from a distance, a trunk button disposed on at least a portion of the main body to allow the user to open a trunk of the vehicle from a distance, and a plurality of climate control buttons to allow the user to control an air conditioner or a heater of the vehicle from a distance.

The main body may include a case for a cellular telephone, tablet computer, or a laptop.

At least one auxiliary button may be disposed on at least a portion of the main body to allow the user to control a volume of a radio of the vehicle.

The main body may include a case for a cellular telephone, tablet computer, or a laptop.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates an elevational front view of a vehicle control device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Vehicle Control Device 100
Main Body 110

Vehicle Control Unit 120

Vehicle Power Button 130

Trunk Button 140

Climate Control Buttons 150

Increase Temperature Button 151

Decrease Temperature Button 152

Auxiliary Control Buttons 160

First Auxiliary Button 161

Second Auxiliary Button 162

Power Source 170

FIG. 1 illustrates an elevational front view of a vehicle control device 100, according to an exemplary embodiment of the present general inventive concept.

The vehicle control device 100 may be constructed from at least one of metal, plastic, wood, and rubber, etc., but is not limited thereto.

The vehicle control device 100 may include a main body 110, a vehicle control unit 120, a vehicle power button 130, a trunk button 140, a plurality of climate control buttons 150, a plurality of auxiliary control buttons 160, and a power source 170, but is not limited thereto.

Referring to FIG. 1, the main body 110 is illustrated to have a rounded rectangular prism shape. However, the main body 110 may be rectangular, circular, cylindrical, triangular, pentagonal, hexagonal, heptagonal, octagonal, or any other shape known to one of ordinary skill in the art, but is not limited thereto.

The main body 110 may be removably connected to at least a portion of a mobile device 10, such as a cell phone, a tablet computer, a personal digital assistant (PDA), and/or a laptop computer. In other words, the main body 110 may at least partially surround and/or cover the mobile device 10. As such, the main body 110 may be a case for the mobile device 10. Furthermore, the main body 110 may be portable and may be stored within a pocket on clothing and/or pants and/or hung from a key chain.

The vehicle control unit 120 may include a processing unit, a communication unit, and a storage unit, but is not limited thereto.

The processing unit (or central processing unit, CPU) of the vehicle control unit 120 may include electronic circuitry to carry out instructions of a computer program by performing basic arithmetic, logical, control and input/output (I/O) operations specified by the instructions. The processing unit of the vehicle control unit 120 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit of the vehicle control unit 120 may also include a microprocessor and a microcontroller.

The communication unit of the vehicle control unit 120 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, global positioning system (GPS) receiver, USB, Firewire, and Ethernet.

The storage unit of the vehicle control unit 120 may include a random access memory (RAM), a read-only memory (ROM), a hard disk, a flash drive, a database connected to the Internet, cloud-based storage, Internet-based storage, or any other type of storage unit.

The vehicle control unit 120 may have a software application and/or a mobile application running thereon. For sake of brevity, the software application and/or the mobile application may hereafter be referred to as an app. The vehicle control unit 120 may have the app preloaded during manufacture and/or alternatively, the vehicle control unit 120 may connect to the Internet to download the app thereon. Also, the vehicle control unit 120 may be preconfigured to connect a specific type of vehicle, brand of vehicle, and/or model of vehicle.

The vehicle control unit 120 may be removably connected within at least a portion of the main body 110. More specifically, the vehicle control unit 120 may be springingly connected (e.g., clipped) within the main body 110, such that a spring may bias the vehicle control unit 120 to be at least partially ejected from the main body 110. However, the vehicle control unit 120 may remain secured within the main body 110 while depressed to be locked therein. In other words, the vehicle control unit 120 may be depressed a second time to engage the spring to eject the vehicle control unit 120.

The vehicle control unit 120 executing the app may connect to at least one external vehicle, such as an automobile, a truck, a sport utility vehicle (SUV), and/or a van. Moreover, the vehicle control unit 120 executing the app may operate at least one command of the external vehicle. Furthermore, the vehicle control unit 120 executing the app may send at least one command to the external vehicle based on at least one input received from the vehicle power button 130, the trunk button 140, the plurality of climate control buttons 150, and/or the plurality of auxiliary control buttons 160.

The vehicle power button 130 may be disposed on at least a portion of the main body 110. The vehicle power button 130 may turn on the external vehicle in response to being depressed a first time. Conversely, the vehicle power button 130 may turn off the external vehicle in response to being depressed a second time.

The trunk button 140 may be disposed on at least a portion of the main body 110. The trunk button 140 may open a trunk of the external vehicle in response to being depressed a first time. Conversely, the trunk button 140 may close the trunk of the external vehicle in response to being depressed a second time.

The plurality of climate control buttons 150 may include an increase temperature button 151 and a decrease temperature button 152, but is not limited thereto.

The increase temperature button 151 may be disposed on at least a portion of the main body 110. The increase temperature button 151 may increase a temperature level within the external vehicle in response to being depressed. Additionally, the increase temperature button 151 may be turn on a climate system (e.g., heat, air conditioning) within the external vehicle in response to being depressed for a predetermined period of time (e.g., five seconds, ten seconds) and/or predetermined number of times (e.g., two times, five times) without turning on all systems of the external vehicle while the external vehicle is already off.

The decrease temperature button 152 may be disposed on at least a portion of the main body 110. The decrease temperature button 152 may decrease the temperature level within the external vehicle in response to being depressed. Additionally, the decrease temperature button 152 may be turn off the climate system (e.g., heat, air conditioning) within the external vehicle in response to being depressed for a predetermined period of time (e.g., five seconds, ten seconds) and/or predetermined number of times (e.g., two times, five times) without turning off all systems of the external vehicle.

The plurality of auxiliary control buttons 160 may include a first auxiliary button 161 and a second auxiliary button 162, but is not limited thereto.

The first auxiliary button 161 may be disposed on at least a portion of the main body 110. The first auxiliary button 161 may be used for other functions of the external vehicle. For example, the first auxiliary button 161 may increase a volume level of a radio within the external vehicle and/or raise at least one window within the external vehicle. Additionally, the first auxiliary button 161 may be turn on the radio within the external vehicle in response to being depressed for a predetermined period of time (e.g., five seconds, ten seconds) and/or predetermined number of times (e.g., two times, five times) without turning on all systems of the external vehicle.

The second auxiliary button 162 may be disposed on at least a portion of the main body 110. The second auxiliary button 162 may be used for other functions of the external vehicle. For example, the second auxiliary button 162 may decrease the volume level of the radio within the external vehicle and/or lower the at least one window within the external vehicle. Additionally, the second auxiliary button 162 may be turn off the radio within the external vehicle in response to being depressed for a predetermined period of time (e.g., five seconds, ten seconds) and/or predetermined number of times (e.g., two times, five times) without turning off all systems of the external vehicle.

It is important to note that the vehicle power button 130, the trunk button 140, the plurality of climate control buttons 150, and/or the plurality of auxiliary control buttons 160 may alternatively be touchscreen buttons on a display screen instead of physical buttons.

The power source 170 may include a battery and a solar cell, but is not limited thereto.

The power source 170 may be disposed within at least a portion of the main body 110. The power source 170 may provide power to the vehicle control unit 120, the vehicle power button 130, the trunk button 140, the plurality of climate control buttons 150, and/or the plurality of auxiliary control buttons 160.

Therefore, the vehicle control device 100 may provide remote control functions to the external vehicle while using the mobile device 10. Also, the vehicle control device 100 may have further functionality over and above a standard vehicle key and/or key fob.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vehicle control device, comprising:
   a main body comprises a case for a cellular telephone;
   a vehicle control unit disposed within the main body to allow a user to control a vehicle;
   a vehicle power button disposed on at least a portion of the main body to allow the user to power on the vehicle from a distance;
   a trunk button disposed on at least a portion of the main body to allow the user to open a trunk of the vehicle from a distance; and
   a plurality of climate control buttons to allow the user to turn on and control an air conditioner or a heater of the vehicle from a distance, such that pressing at least one of the plurality of climate control buttons for a predetermined period of time turns off the at least one of the air conditioner or the heater.

2. The vehicle control device of claim 1, wherein the main body comprises a tablet computer, or a laptop.

3. The vehicle control device of claim 1, further comprising:
   at least one auxiliary button disposed on at least a portion of the main body to allow the user to control a volume of a radio of the vehicle.

* * * * *